(12) United States Patent
Francis et al.

(10) Patent No.: US 12,572,193 B2
(45) Date of Patent: Mar. 10, 2026

(54) ENHANCED ELECTRICITY LIMITATION ENFORCEMENT DURING APPLICATION RUNTIME

(71) Applicant: MICROSOFT TECHNOLOGY LICENSING, LLC, Redmond, WA (US)

(72) Inventors: Robert Binneweg Francis, Bothell, WA (US); Mark James McNulty, Renton, WA (US); Perry Victor Lea, Boise, ID (US); Christopher J. Tector, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 109 days.

(21) Appl. No.: 18/131,864

(22) Filed: Apr. 6, 2023

(65) Prior Publication Data

US 2024/0338067 A1  Oct. 10, 2024

(51) Int. Cl.
*G06F 1/32* (2019.01)
*G06F 1/324* (2019.01)
*G06F 1/329* (2019.01)

(52) U.S. Cl.
CPC .............. *G06F 1/324* (2013.01); *G06F 1/329* (2013.01)

(58) Field of Classification Search
CPC ................................ G06F 1/324; G06F 1/329
See application file for complete search history.

(56) References Cited

U.S. PATENT DOCUMENTS

| | | |
|---|---|---|
| 9,250,684 B1 | 2/2016 | Chen |
| 9,715,265 B1 * | 7/2017 | Cairns ........................ G06F 1/32 |
| 2007/0186123 A1 * | 8/2007 | Winbom ............... G06F 1/3203 |
| | | 713/322 |
| 2008/0020803 A1 | 1/2008 | Rios et al. |

(Continued)

FOREIGN PATENT DOCUMENTS

| | | |
|---|---|---|
| CN | 109529343 A | 3/2019 |
| CN | 105719229 B | 3/2020 |

OTHER PUBLICATIONS

"Max Frame Rate: Cap Frame Rates, Save Power, and More", Retrieved from: https://nvidia.custhelp.com/app/answers/detail/a_id/ 4958/~/max-frame-rate%3A-cap-frame-rates%2C-save-power%2C-and-more, Jan. 18, 2022, 3 Pages.

*Primary Examiner* — Jaweed A Abbaszadeh
*Assistant Examiner* — Cheri L Harrington
(74) *Attorney, Agent, or Firm* — Scott Y. Shigeta; Newport IP, LLC

(57) ABSTRACT

A system gives application developers and other users access to the real-time power consumption data of the hardware they are running on. In some embodiments, the system can provide an application programming interface (API). The system also provides a way for users to declare what is their maximum power limit they want to stay under. This could be combined as an OS setting that users, or cloud hardware managers, can enable, which will tell the application it is running in this power-capped mode. The application will then use the real-time power consumption data to see how close it is consuming to the specified cap. When the real-time power consumption data meets one or more criteria with respect to a specified cap, the application can dynamically adjust one or more operations to keep the power consumption of itself under the specified cap.

16 Claims, 8 Drawing Sheets

(56) References Cited

U.S. PATENT DOCUMENTS

| | | | | |
|---|---|---|---|---|
| 2013/0046967 | A1* | 2/2013 | Fullerton | G06F 1/32 |
| | | | | 713/100 |
| 2014/0351613 | A1 | 11/2014 | Kansal et al. | |
| 2015/0126254 | A1 | 5/2015 | Zimmermann et al. | |
| 2015/0323974 | A1* | 11/2015 | Shuster | G06F 1/3212 |
| | | | | 713/320 |
| 2016/0124495 | A1* | 5/2016 | Kim | G06F 1/3228 |
| | | | | 713/323 |
| 2016/0299551 | A1* | 10/2016 | Wu | G06F 1/3287 |
| 2017/0185134 | A1* | 6/2017 | Han | G06F 1/26 |
| 2017/0300108 | A1* | 10/2017 | Yang | G06F 1/28 |
| 2018/0253135 | A1* | 9/2018 | Singh | G06F 1/3212 |
| 2019/0107880 | A1* | 4/2019 | Jung | G06F 1/3234 |
| 2020/0245252 | A1* | 7/2020 | Zhao | G06F 1/329 |
| 2021/0223848 | A1* | 7/2021 | Rao | G06F 1/3243 |
| 2021/0232200 | A1* | 7/2021 | King | G06F 9/4893 |
| 2021/0334187 | A1* | 10/2021 | Sewani | G06F 1/324 |
| 2022/0253124 | A1* | 8/2022 | Venkataraman | G06F 9/5094 |
| 2022/0365586 | A1* | 11/2022 | Kim | G06F 1/305 |
| 2022/0404888 | A1* | 12/2022 | Prabhakar | G06F 1/3296 |
| 2023/0054476 | A1* | 2/2023 | Ellis | G06F 13/24 |
| 2023/0205301 | A1* | 6/2023 | Duenas | G06F 1/3234 |
| | | | | 713/300 |
| 2024/0019890 | A1* | 1/2024 | Ma | G06F 1/08 |

* cited by examiner

Scheduling and Prioritization Embodiment

Original Schedule Prior to Power Management Scheduling

Adjusted Schedule After the Application Performs its Power Management Scheduling Display of Real-Time Telemetry Data

700

702  RECEIVE A POWER CONSUMPTION THRESHOLD

704  RECEIVE REAL-TIME POWER CONSUMPTION DATA

706  POWER LEVEL MEETS CRITERIA

NO

YES

708  ADJUST OPERATIONAL PARAMETERS OF THE APPLICATION

ENHANCED ELECTRICITY LIMITATION ENFORCEMENT DURING APPLICATION RUNTIME

BACKGROUND

Some applications, such as video games, are becoming more complex and operate with an increasing rate of power consumption. Among many other factors, this increased complexity and power consumption is due to increased graphics capabilities. Users are becoming more aware of how much electricity their video games and other applications consume and the impact on both their electricity bill and their carbon footprint. Additionally, now that some applications, such as video games, are expanding into the cloud, other problems arise where the wide electrical usage patterns across applications makes it difficult for system designers to optimize racks of hardware that can facilitate as many applications as possible within the specified power limitations of a data center. In addition, some software developers are challenged with the task of designing applications that also meet power consumption limitations.

The above-described concerns and challenges may be difficult to address when some existing systems are utilized. For example, some existing systems have taken consoles and turned them into blade hardware that are deployed into data centers. Thus, instead of relying on client computers, such as a gaming console or a personal computer, the heavy processing of an application, such as a game, is executed in the cloud. The problems and constraints that are encountered in this design are that each hardware unit has a specific peak electrical footprint that it needs to adhere to, but existing systems do not provide reliable methods managing the power consumption of each hardware unit. Having predictable workloads from a peak electrical standpoint is advantageous because then it lets designers construct the hardware in specific configurations and scope it so that they can maximize the number of concurrent users that can be using that hardware at one time. However, video games and other applications historically have not had a reliable level of predictability when it comes to power usage. Thus, making it difficult for system designers to optimize cloud rack systems.

SUMMARY

The techniques disclosed herein provide application-aware and operating system (OS) enforced electricity limitations during runtime. An application is configured to execute within a context of the application being a majority contributor of the power consumption within the operating environment of a hardware unit. The application is also configured to operate autonomously to self-regulate its power consumption while in a power-capped mode. The application uses real-time power consumption data to see how close the application is consuming power relative to a specified cap. When the real-time power consumption levels meets one or more criteria with respect to a specified cap, the application can dynamically adjust one or more operations to keep the power consumption of the application under the specified cap. In some embodiments, the application ranks the operations according to their power consumption level. The application can then adjust the higher-ranking operations, e.g., the most power-hungry operations, to allow the application to keep the power consumption rate below the specified cap. For example, operations that control parameters for resolution levels, frame rates, anti-aliasing, and lighting calculations, shadow calculations, can be adjusted. The application can also schedule certain operations and related tasks to ensure that the application operates under the specified power cap. An operating system (OS) can also monitor power usage as a safeguard in this mode, and if the application goes over the limit for a threshold duration and/or threshold magnitude, it will either terminate the application or turn on its own throttling, and also provide one or more notifications. The notifications can inform users, developers, or system designers of each event and the related consumption levels.

The disclosed techniques give application developers, system designers, and end users access to the real-time power consumption data of the system they are running on. In a more detailed example, an application can provide an application programming interface (API) to communicate power consumption data and operating status information. The application also provides mechanisms for users to declare a maximum power limit they want to stay under. This could be combined as an OS setting that users or cloud hardware managers can enable, which will tell the application it is running in this power-capped mode. The application will then use the real-time power consumption data to see how close an application is consuming power relative to the specified cap. When the real-time power consumption data indicates a power consumption level that approaches the power cap, one or more adjustments to an application may be made. For example, a video game may reduce video resolution levels or a frame rate. Other examples of adjustments include the deactivation or scheduling of operations that control anti-aliasing features, lighting features, shadow features, etc. If the application determines that its power consumption goes over the limit for some threshold duration and/or by a given magnitude, it will either terminate the application or turn on its own throttling.

To address some of the system design challenges summarized above, the techniques described herein allow applications to run in more of a predictable power profile so that a system designer can maximize the amount of utilization of a rack without installing more hardware that can't be used simultaneously or installing less hardware and therefore not maximally using the space that's been allocated in a data center. In addition, when it comes to sustainability, games and OS mechanisms are configured with the ability to opt in to running in a low power consumption mode in a way that the application is designed.

In some embodiments, an application is provided information and APIs that are needed in order to monitor the power and the mechanisms to adjust their operating state such that the application can be in charge of how it can stay under a given power budget. The applications can be configured to elect to be able to run under a power-capped mode or a regular mode, which is not power-capped. In addition to giving applications access to information and mechanisms to declare that they can run under a specific power limit, e.g., a threshold, the techniques disclosed herein also allow system designers to design racks of server hardware that can acknowledge that upper limit. This helps designers maximize the number of servers that are put into a rack to fit a per rack electrical budget of a data center.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
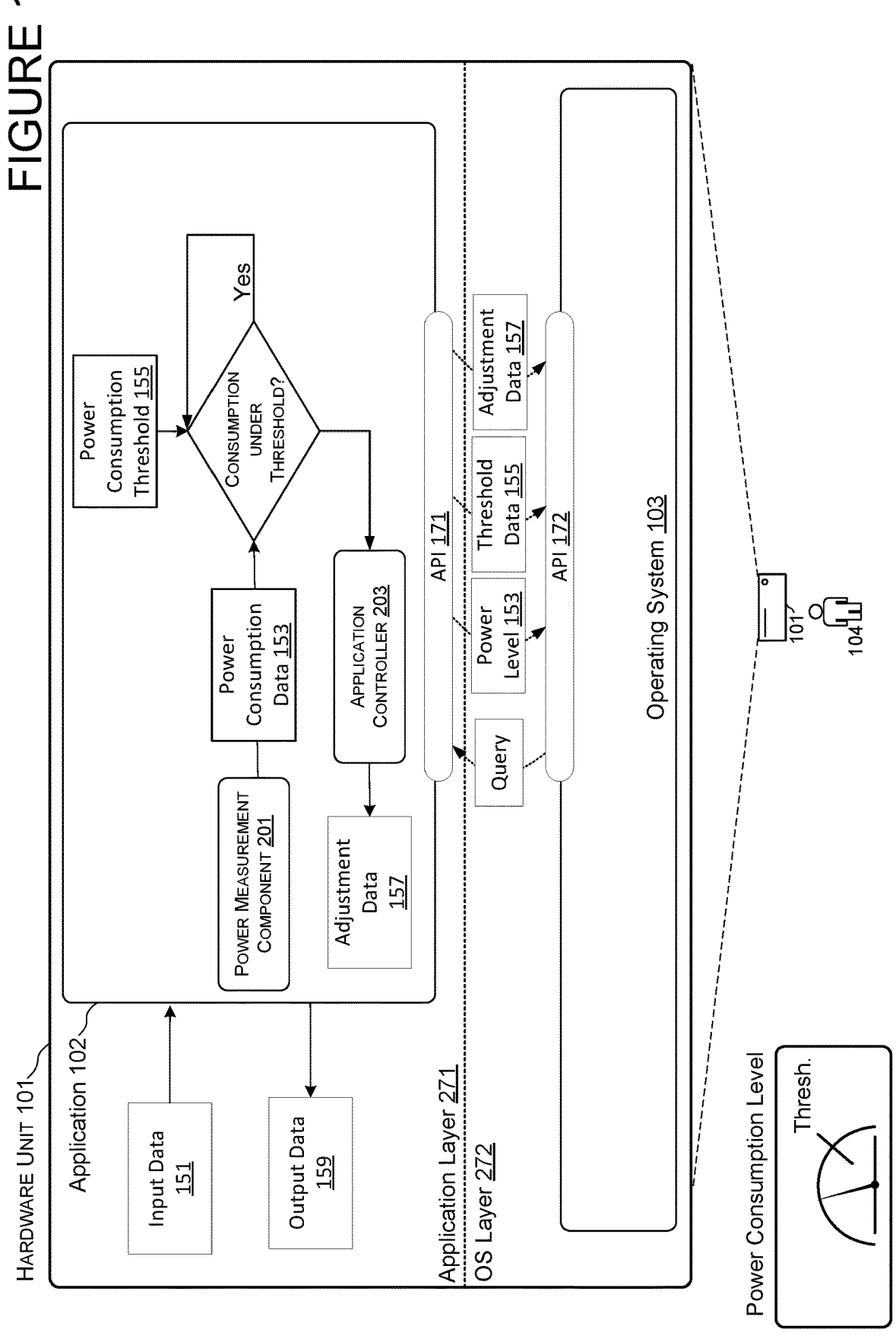
FIG. 1 is a block diagram of a system that provides enhanced electricity limitation enforcement during application runtime, where the system is in the form of a gaming console.
Figure 2:
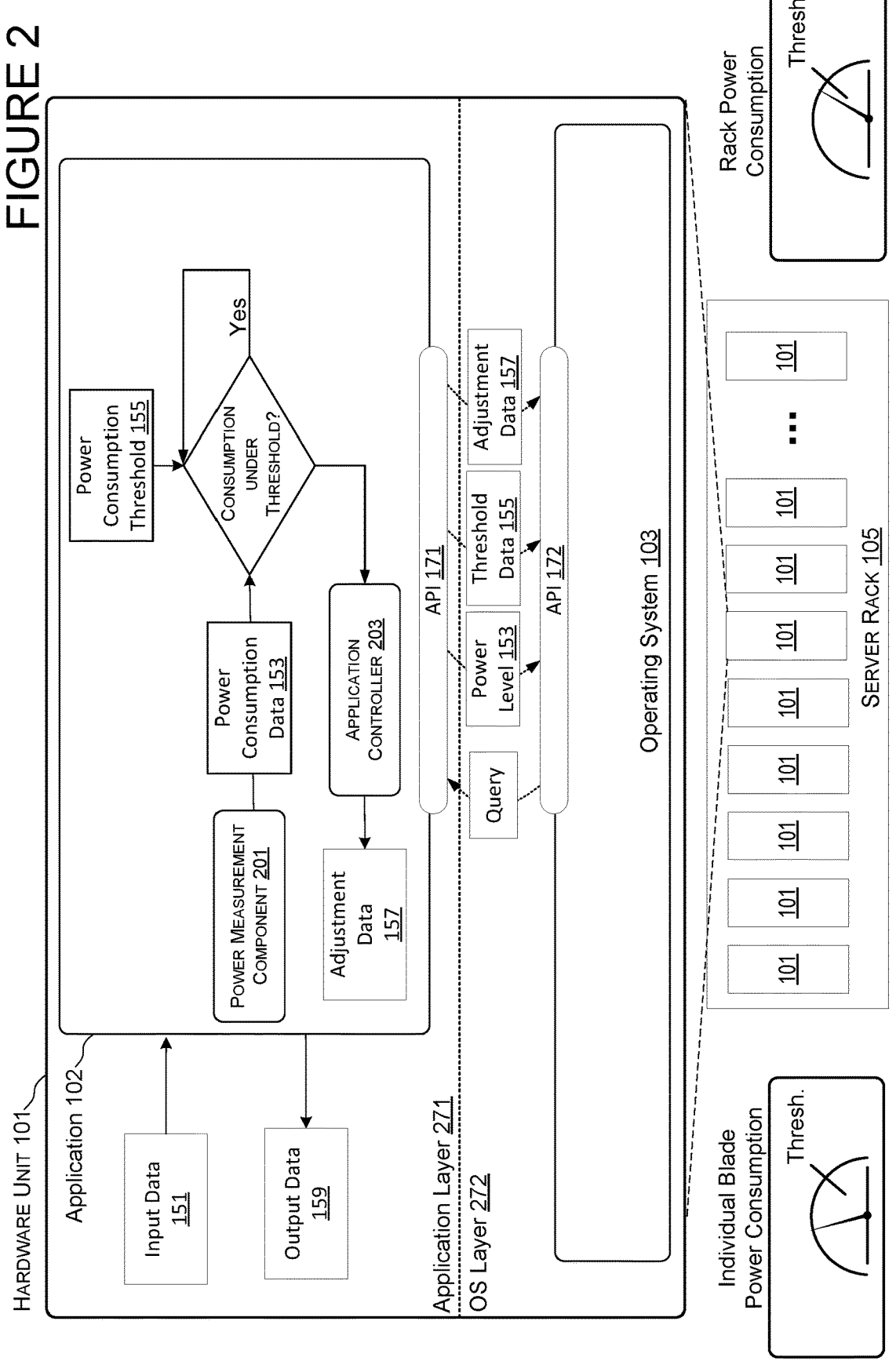
FIG. 2 is a block diagram of a system that provides enhanced electricity limitation enforcement during application runtime, where the system is in the form of a blade that is installed in data center rack.

FIG. 1 is a block diagram of a system that provides enhanced electricity limitation enforcement during application runtime. In some configurations, the disclosed techniques can utilize a single piece of hardware 101 that is running a single game. For illustrative purposes, the single piece of hardware is also referred to herein as a hardware unit 101, and the hardware unit 101 is configured to execute an application 102 in the application layer 271 and an operating system 103 in an operating system layer 272. As described in more detail below, a hardware unit can also be divided into partitions and an individual application can execute in each partition. A hardware unit 101 can be implemented in a number of different configurations. For example, as shown in FIG. 1, the hardware can be a computing device that is operated by an end user 104. This can include hardware in the form of a video game console in someone's house. In another example, as shown in FIG. 2, the hardware unit 101 can be in the form of a blade of a server rack 105 of a data center. In such configurations, each hardware unit 101 can be used to accommodate multiple tenants, each operating applications within one hardware unit 101 or operating applications within individual hardware unit partitions.

The techniques disclosed herein can be used in both scenarios and each scenario offers different technical benefits. In a first example scenario, a local game 102 that is running on a console at someone's house allows energy-conscious users to activate an eco-mode and the game can control an amount of energy that is consumed during runtime. Such games that support this feature will run at a controlled power consumption level. The game can also generate metadata that indicates that the games supports the eco mode. The game can also utilize APIs 171 that can call into the operating system (OS) and communicate a power consumption limit 155 and a real-time power consumption level 153 of the hardware unit 101 that the game is running on. Then, utilizing other APIs, the game can make adjustments based on an analysis of the real-time power consumption level relative to the power consumption limit. For instance, the game can communicate adjustment data 157 that can cause the hardware to down clock a GPU, put the GPU into a lower power state, lower a video resolution, or change other video settings in order to bring that real-time power consumption level down to a suitable level. If the game is not adhering to the declared budget, e.g., the power consumption limit 155, the OS can terminate the execution of the game.

These features can also be used to help a developer of an application. When a software developer is designing an application, the developer can utilize the real-time data to identify performance anomalies and make changes to the codebase to help optimize the efficiency of the application. The real-time power consumption level 153 can be displayed in real time to a developer, and the developer can make changes to the code base by using these real-time measurements and notifications of events. These mechanisms can also be used in a debugging and performance optimizing stage of a development cycle.

The above-described mechanisms can be utilized in the second scenario shown in FIG. 2 where the hardware unit 101 is located in a data center. In this scenario, a system designer may want to be able to optimize the design of the server. This can be accomplished by the fact that an application running on each piece of hardware can adhere to a power ceiling. By the use of these techniques in a server implementation, a system designer can put more pieces of hardware, e.g., more users and corresponding applications, in a rack 105. Having an electrical usage ceiling for each piece of hardware 101 helps keep a collection of hardware in a rack to stay below a rack limit, e.g., a per rack limit, which is helpful since each rack in a data center has a rated power consumption capacity.

These techniques for monitoring the power consumption of a hardware unit and comparing real-time power consumption levels with a consumption limit can be conducted while the device is connected to other devices, or the hardware unit can run autonomously and these techniques can also be used while the hardware unit is offline. For example, each console in the home user scenario can operate as a self-contained system and operate as a closed system. In this scenario, the at-home video game console could be online or it could be disconnected from the Internet and execute the power monitoring processes described herein. This allows the hardware to maximize the user experience while controlling the power consumption. In addition, a hardware unit that is installed in a rack in a data center can be configured with the same features and tools as the hardware implemented for the home use scenario. Each hardware unit installed in a data center rack can operate autonomously and also operate as a self-contained system, and operate while being connected to the Internet or while being in an offline status.

A system can determine if an application supports a low power consumption mode. If the system determines that the application supports a low power consumption mode, the system can run the application in that mode. This allows a system to have sustainability initiatives around applications that opt into this. This gives users assurances that the application they are using saves electricity by just being in this mode. Users can allow applications to opt in by an input or by having a user profile indicate their preferences on which applications run in this mode. Applications are also configured to declare that they support this eco-mode, have mechanisms for the application to query the status of the mode it's running in, query its current power usage, and tooling to adjust the system to run the application using different settings. For instance, an application can run at lower speeds or a half power mode by calling these tools to bring itself down. By the use of these mechanisms and tools, applications can have real-time monitoring of its power usage, so it can make adjustments, e.g., change a resolution level. In addition, applications can also have off-line tooling to profile its operations while it is running. A user input or profile data can also be used to deactivate the low power consumption mode, and in response to such an input the application can terminate all processes that monitor power consumption levels and processes for making adjustments based on the real-time power consumption levels.

An example method for controlling a power consumption level 153 of an application 102 can include the use of a threshold value 155. The threshold value 155 that can be from a user input, a user profile, or by AI operations that are configured to determine an optimal consumption limit. For example, the threshold value 155 can be received in the input data 151. The method can also include operations for receiving data indicating the real-time power consumption level 153. This can be from a power measurement component 201, which may include one or more sensors configured to measure power usage of the hardware unit. The power consumption data 153 can indicate the real-time power consumption level caused by the hardware unit 101 executing the application 102, wherein the application is executing within a context of the application 102 being the majority contributor of the power consumption within the operating environment. The application is configured to monitor the real-time power consumption level and compare that measurement against the threshold 155. The application can cause one or more operating adjustments to the application itself or cause operation changes within an operating system in response to determining that the real-time power consumption level meets one or more criteria.

For instance, an adjustment can be made if the real-time power consumption level approaches the threshold. In such scenarios, adjustments to one or more operating parameters that reduce the power level consumed by the hardware unit can be initiated in response to determining that the current power level is within a predetermined range of the power threshold for a predetermined time. In another scenario, an adjustment can be made if the real-time power consumption level exceeds the threshold. In such scenarios, an application can be terminated or adjusted in response to determining that the power level exceeds the power threshold by a predetermined magnitude and/or for a predetermined time period. The predetermined magnitude and/or the predetermined time period is used to prevent false positive readings that cause unnecessary adjustments. For example, a power surge that lasts only 2 milliseconds may not cause an adjustment as such events can be caused by temporary energy spikes.

The application can make any adjustment to the hardware unit or the application that causes a reduction in power consumption. For example, the adjustment of the one or more operating parameters of the application can include, but is not limited to, at least one of reducing a rendered resolution, reducing a number of frames per second, modifying an anti-aliasing parameter, modifying a lighting parameter, or modifying a shadow parameter. This may include terminating all operations that support a special lighting effect or a shadowing effect.

In some embodiments, the adjustments may include scheduling operations or tasks related to certain features. While in a power-capped mode, the system may make adjustments for an application to stay under a power cap by anticipating spikes in a first process during a given period of time, and then adjusting other processes in that period of time to reduce power consumption. For example, a power policy may be defined in a user profile. That profile may have a power limit for a particular game and have other power limits for other games. When a selected game is operating in eco-mode, the power limit for that selected game is used. The system now has the data that is needed, and the system scales its own processes. This causes the system to have to change its operations or priorities of operations to fit all processes under the limit. For example, if the system detects that the game is going to spike on NPU traffic, then the game will need to cause a reduction on GPU traffic or other processes, e.g., generate video data using a lower resolution, to keep the power consumption below the limit during that spike by the NPU traffic. This processing is automatic and autonomous from any external control, as the application performs the power monitoring operations and the power regulation adjustments.

Figure 3:
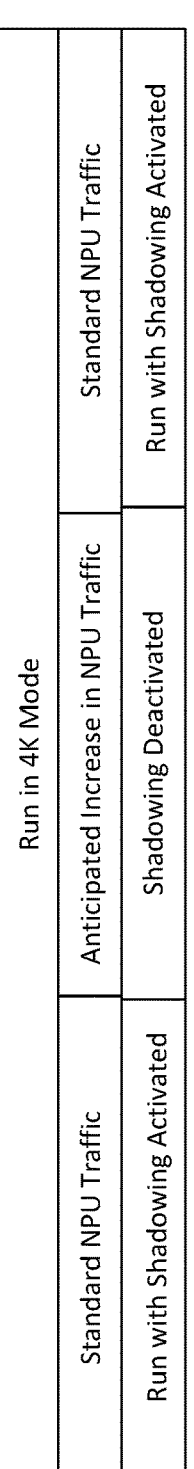
FIG. 3 shows an example involving a scheduling and prioritization embodiment.
Figure 3:
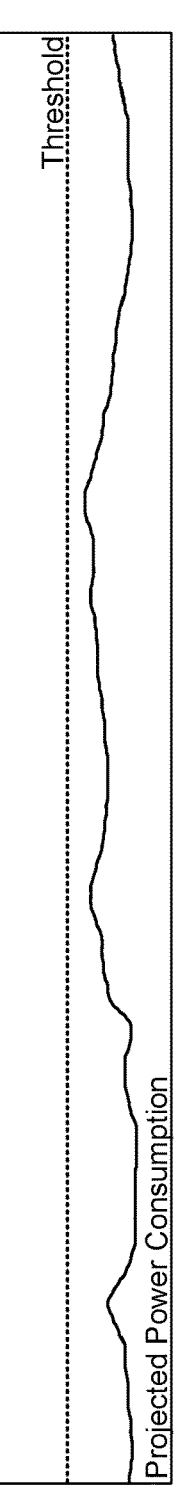

Referring now to FIG. 3, an example involving a scheduling and prioritization embodiment is shown. In this example, the input data, e.g., a user profile, may also indicate that a user has a preference to run a game with certain settings that require higher performance. For example, a user may indicate that they want to play a game at 4K resolution but also stay under a particular power threshold, e.g., 150 watts. The game can make the changes based on the user preferences, determine select adjustments that are required to allow the preferred changes, and then monitor the game activity in runtime to make sure the game operates the hardware unit below a given power threshold. In this example, the application determines that a spike in NPU traffic will run the game with a power consumption level that is above the power threshold. In anticipation of this event, the system can schedule an adjustment and deactivate select tasks while maintaining other prioritize tasks. In this example, the application can determine a period of time of the spike in NPU traffic, and deactivate a graphical feature for the period of time, such as shadowing, while allowing other prioritized features, e.g., the 4K resolution, to operate. During runtime, the game can make further adjustments to lower the power consumption if the power measurement does not meet the criteria with respect to the power threshold. For example, the game can reduce the 4K setting to a 720P setting if it detects a real-time consumption level that is above the threshold.

In this example, the system may determine a selection of prioritized tasks and optional tasks to be used during runtime of the application. This may include options such as a selection of a 4K video resolution being a prioritized task and the shadowing being an optional task. The system can then determine the optional tasks to be used for during runtime of the application. The system may then adjust or terminate the optional tasks, while also scheduling the required tasks to allow the application to self-regulate and operate under the power threshold. Thus, the system can balance tradeoffs between different workloads prior to execution and during execution.

Figure 4:
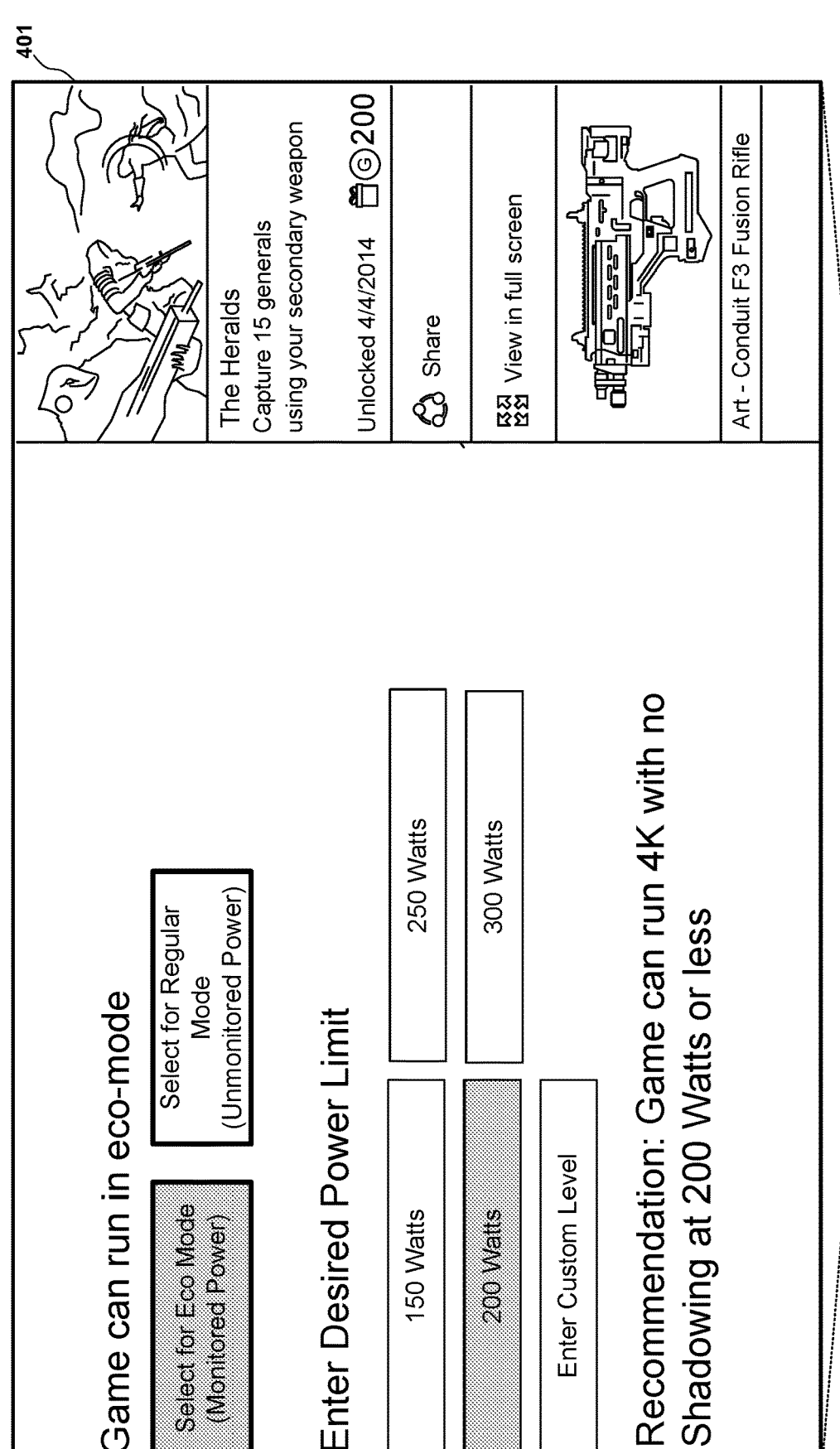
FIG. 4 shows an example user interface where the application provides a user with a notification that the game is capable of a power monitoring mode.

FIG. 4 shows an example user interface where the application provides a user with a notification that the game is capable of a power monitoring mode. In this example, the application also provides a mechanism for an input for that user to activate the power monitoring mode and set a limit. In such embodiments, the application can cause a display of a notification that the application is capable of running in a power-capped mode. The application can also receive an input for activating a power-capped mode for the application. The input for activating a power-capped mode can be received in association with the input data indicating the power threshold for the application. In response to these inputs, the application can activate the power-capped mode. The application can then run in the power-capped mode and cause the hardware unit to monitor the power level consumed by the hardware unit to cause the hardware unit to adjust the one or more operating parameters of the application in response to determining that the power level consumed by the hardware unit meets one or more criteria with respect to the power threshold.

Figure 5:
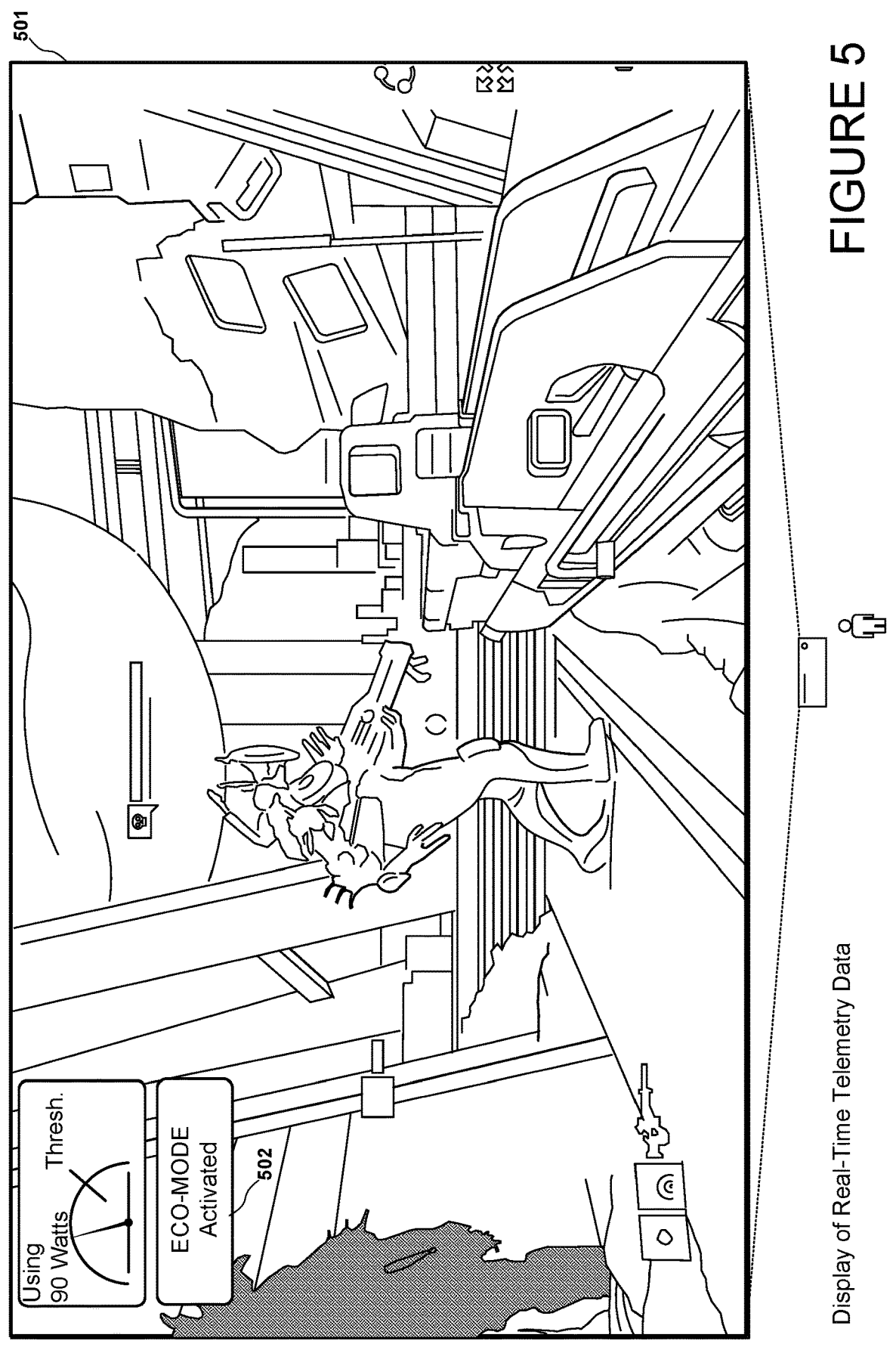
FIG. 5 shows an example user interface where the application provides a notification that the game is running in power-capped mode and display of telemetry data.

FIG. 5 shows an example user interface 501 where the application provides a notification that the game is running in power-capped mode and display of telemetry data. In this example, the application causes a display of a notification 502 that the application is running in a power-capped mode, where the power-capped mode causes the hardware unit to monitor the power level consumed by the hardware unit to cause the hardware unit to adjust the one or more operating parameters of the application. This can be in the form of a text message, a graphical indicator or any other type of display feature. The application also causes a display of real-time telemetry data indicating the power level consumed by the hardware unit and the application. In this example, the application is running under a given threshold.

Figure 6:
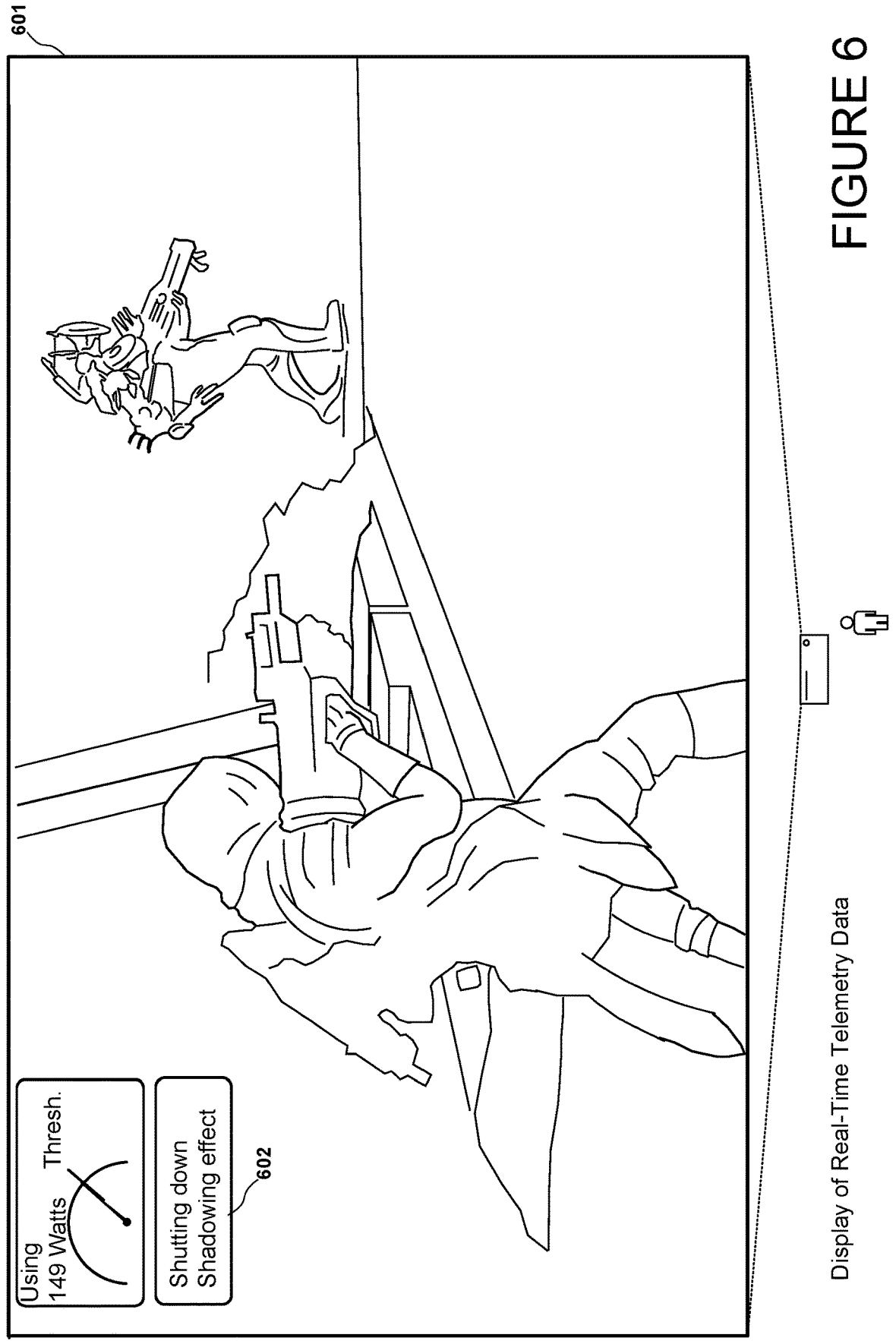
FIG. 6 shows an example user interface where the application provides a notification that the game is running in power-capped mode and provides a notification that the application power consumption is approaching a threshold.

FIG. 6 shows an example user interface 601 where the application provides a notification that the game is running in power-capped mode and provides a notification 602 that the application power consumption is approaching a threshold. In this example, the power level consumed by the hardware unit meets one or more criteria with respect to the threshold, e.g., the power consumption is within a range of the threshold. When the power level consumed by the hardware unit meets one or more criteria with respect to the threshold, the application can cause the display of a notification indicating the type of adjustment that is made to the operations of the application. In this example, since the power level consumed by the hardware unit meets one or more criteria with respect to the threshold, the application displays a notification that the shadowing effect is being deactivated to save power.

Figure 7:
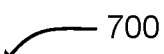
FIG. 7 is a flow diagram showing aspects of a routine for controlling the power consumption of an application.

Turning now to FIG. 7, aspects of a routine 700 for dynamically controlling the power consumption of an application running on a hardware unit. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine are described herein as being implemented, at least in part, by an application, component and/or circuit, such as a device module that can be included in any one of the memory components disclosed herein, including but not limited to RAM. In some configurations, the device module can be a dynamically linked library (DLL), a statically linked library, functionality enabled by an application programing interface (API), a compiled program, an interpreted program, a script or any other executable set of instructions. Data, such as input data or a signal from a sensor, received by the device module can be stored in a data structure in one or more memory components. The data can be retrieved from the data structure by addressing links or references to the data structure.

Although the following illustration refers to the components depicted in the present application, it can be appreciated that the operations of the routine may be also implemented in many other ways. For example, the routine may be implemented, at least in part, by a processor of another remote computer or a local circuit. In addition, one or more of the operations of the routine may alternatively or additionally be implemented, at least in part, by a chipset working alone or in conjunction with other software modules. Any service, circuit or application suitable for providing input data indicating the position or state of any device may be used in operations described herein.

In operation 702, the system receives input data indicating a power consumption threshold for an application. The power consumption threshold can come from any suitable source. For example, the threshold can be from a user input, profile data, or by artificial intelligence (AI) systems used for determining an optimal consumption level for a particular application and a particular hardware configuration. The power consumption threshold can be set prior to runtime.

The power consumption threshold can also be adjusted during runtime. In some configurations, the power consumption threshold can be modified in multiple iterations of this routine.

In operation 704, the system receives real-time power consumption data 153 indicating a power level consumed by the hardware unit 101 executing the application 102. The real-time power consumption data 153 can be generated by the use of one or more sensors determining a wattage level consumed by one or more components of a hardware unit executing an application. This can include a motherboard and processor, graphics cards, and any supporting circuitry that is used to generate the computing environment supporting the execution of the application. The power measurement component 201 can be a combination of hardware and software to generate power consumption data 153 which can include any standard of power measurement, e.g., watts, current with a predetermined voltage, joules, calories, etc.

The hardware 101 is configured such that the application 102, which is also referred to as a primary application 102, is executing within a context of the application 102 being the majority contributor of the power consumption within the operating environment. Thus, in some embodiments, the hardware can be configured such that the application 102 is the only application that is allowed to operate in that unit of hardware. For example, a hardware unit can only run one game application, and is not permitted to execute another game application. The hardware unit can be permitted to execute other categories of applications, e.g., supporting applications that supports the primary application. However, the primary application is categorized as the main application that causes the majority, e.g., greater than a majority threshold, e.g., 90%, of the power consumed by the hardware unit when the primary application is executing. In some configurations, the hardware unit can be configured to only allow one category of applications to operate. For example, a first category of applications can include any application that generates a video output. In this example, the hardware unit only allows one application in this first category of applications to execute, other applications in the same category would be restricted from operating. Other categories of applications, such as supporting drivers and supporting applications would be permitted to operate on the hardware. In one illustrative example, a hardware unit, such as a game console, would only be able to execute one game at a time. If a game is executing on a hardware unit, other media generating applications, such as Netflix, would be restricted until the game execution is terminated. This allows the system to measure and control the power consumption for that hardware unit and for a known application, such as a specific game.

In operation 706, the system determines if the real-time power level consumed by the hardware unit 101 meets one or more criteria with respect to the power threshold. In operation 706, the system can determine that the power level consumed by the hardware unit 101 meets one or more criteria with respect to the power threshold by detecting that the consumption level has reached predetermined magnitude. In some embodiments, the system determines that the power level consumed by the hardware unit 101 meets one or more criteria with respect to the power threshold when that the consumption level has reached predetermined magnitude for a predetermined duration. Thus, a triggering action of making an adjustment can only occur if the consumption level reaches a threshold and/or approaches or reaches a threshold for a predetermined period of time.

For example, when the consumption level approaches the threshold, the routine can proceed to operation 708, where the system adjusts one or more operational parameters of the application to reduce power consumption, as opposed to shutting it down. In such embodiments, when the power level consumed by the hardware unit meets one or more criteria with respect to the power threshold when the power level is within a predetermined range of a power threshold for a predetermined time, the system adjusts one or more operating parameters to reduce the power level consumed by the hardware unit caused by the execution of the application.

In another example, when the consumption level exceeds the threshold, the routine can proceed to operation 708, where the system terminates the application. In such an example, when the power level exceeds the power threshold by a predetermined magnitude, the system adjusts one or more operating parameters to terminate the execution of the application. This adjustment can also occur when the consumption level exceeds the threshold by a predetermined magnitude for a predetermined period of time. At operation 706, if the power level does not meet any predetermined criteria or predetermined power policy, the routine returns to operation 704 where the system continues to monitor the power consumption.

The adjustments to the one or more operating parameters can include any adjustment that reduces the power level consumed by the hardware unit caused by the execution of the application. For example, the adjustments to the one or more operating parameters can include, but is not limited to, reducing a rendered resolution of a video output or reducing a frame rate of a video output. The adjustments can also include modifying an anti-aliasing parameter, modifying a lighting parameter, or modifying a shadow parameter. This can include deactivation of a particular feature, such as shutting down all processes for generating shadows and causing an output to change such that shadows are not generated. In runtime of the application, the routine may cycle through operations 704 through 708 to continually monitor the power usage. The routine may also adjust the power consumption threshold while cycling through operations 704 through 708 to continually monitor the power usage.

A system can have policies that define a power consumption limit for a multi-partition system. Thus, the system can determine a sum of the power consumption of levels for each of the partitions of the system. Using the sum, the system can determine if the overall power consumption of the system level exceeds a multi-partition system threshold. An output can be granted to cause the addition, activation, removal or deactivation of one or more partitions, if the sum of the power consumption of each partition exceeds the multi-partition system threshold. This technique can help a designer configure a multi-partition system, or a multi-tenant system, to optimize resources of a system while also adhering a system to an overall power usage limit.

A system can also have policies that define a power consumption limit for a rack system that is used for powering individual hardware units. Thus, the system can then determine a sum of the power consumption of levels for each of the hardware units of the rack. Using the sum, the system can determine if the overall power consumption of the rack exceeds a rack threshold. An output can be granted to cause the addition, activation, removal or deactivation of one or more hardware units, if the sum of the power consumption level of each hardware unit exceeds the rack threshold. This technique can help a designer configure a rack system or a multi-tenant system, to optimize resources of a rack while also adhering a system to an overall power usage limit. For example, a rack can power a number of hardware units up to a maximum of 1000 Watts. If each application running of each hardware unit can hold to a maximum power consumption, e.g., 150 Watts, then the system designer can configure the rack to run near, but not over, the maximum capacity by selecting a number of hardware units. In this example, the rack could hold six hardware units and run at optimal levels for the rack. This way, the rack is not underutilized but the overall power consumption of all of the hardware units will also not exceed the rack threshold since each hardware unit will safely stay under each of its own power thresholds. Thus, an output of the routine can also include power levels that can be used to indicate a need to activate, add, deactivate or remove partitions and/or hardware units in a larger system, such as a rack system. For illustrative purposes, the hardware unit can also be referred to herein as a system, device, or a computer. A rack can also be referred to herein as a system or device having multiple hardware units.

Some embodiments of the routine can include techniques for controlling a power consumption level 153 caused by an application 102 configured for execution on a hardware unit 101, wherein the routine comprises: receiving input data 155 indicating a power threshold for the application 102; receiving real-time power consumption data 153 indicating the power consumption level of the hardware unit 101 executing the application 102, wherein the application 102 is executing within a context of the application 102 being the majority contributor of the power consumption within the operating environment; determining that the power level consumed by the hardware unit 101 meets one or more criteria with respect to the power threshold; and in response to determining that the power level consumed by the hardware unit 101 meets one or more criteria with respect to the power threshold, causing the application to self-regulate the power consumption level by adjusting one or more operating parameters of the hardware unit 101 or one or more operating parameters of the application executing on the hardware unit 101 to reduce the power consumption level.

In the routine, the hardware unit can include a feature where adjusting the one or more operating parameters of the application includes at least one of reducing a rendered resolution, reducing a number of frames per second, modifying an anti-aliasing parameter, modifying a lighting parameter, or modifying a shadow parameter, wherein adjusting the one or more operating parameters of the hardware unit includes at least one of reducing a clock frequency of one or more processing units of the hardware unit or causing a one or more processing units of the hardware unit to operate in a low-power state.

In the routine, the hardware unit can include a feature where the power level consumed by the hardware unit meets one or more criteria with respect to the power threshold when the power level is within a predetermined range of the power threshold for a predetermined time, and wherein adjusting one or more operating parameters includes adjustments that reduce the power level consumed by the hardware unit 101 caused by the execution of the application.

In the routine, the hardware unit can include a feature where the power level consumed by the hardware unit meets one or more criteria with respect to the power threshold when the power level exceeds the power threshold by a predetermined magnitude, and wherein adjusting one or more operating parameters includes terminating the execution of the application.

In the routine, the hardware unit can include a feature where the hardware unit includes an execution environment where the application is the majority consumer of power of the hardware unit or a majority influencer of power consumption of the of the hardware unit.

In the routine, the hardware unit can include a feature where adjusting the one or more operating parameters of the application comprises: determining a selection of prioritized tasks to be used during runtime of the application; determining a selection of optional tasks to be used for during runtime of the application, wherein adjusting one or more operating parameters includes adjusting or terminating the optional tasks or scheduling the prioritized tasks or the optional tasks to allow the application to self-regulate and operate under the power threshold.

The routine can also include operations for causing a display of a notification that the application is capable of running in a power-capped mode; receiving an input for activating a power-capped mode for the application, wherein the input is received in association with the input data indicating the power threshold for the application; and activating the power-capped mode in response to receiving the input for activating the power-capped mode, wherein the power-capped mode causes the hardware unit to monitor the power level consumed by the hardware unit to cause the hardware unit to adjust the one or more operating parameters of the application in response to determining that the power level consumed by the hardware unit meets one or more criteria with respect to the power threshold.

The routine can also include operations for causing a display of a notification that the application is running in a power-capped mode, wherein the power-capped mode causes the hardware unit to monitor the power level consumed by the hardware unit to cause the hardware unit to adjust the one or more operating parameters of the application; and causing a display of real-time telemetry data indicating the power level consumed by the hardware unit and caused by the application.

Figure 8:
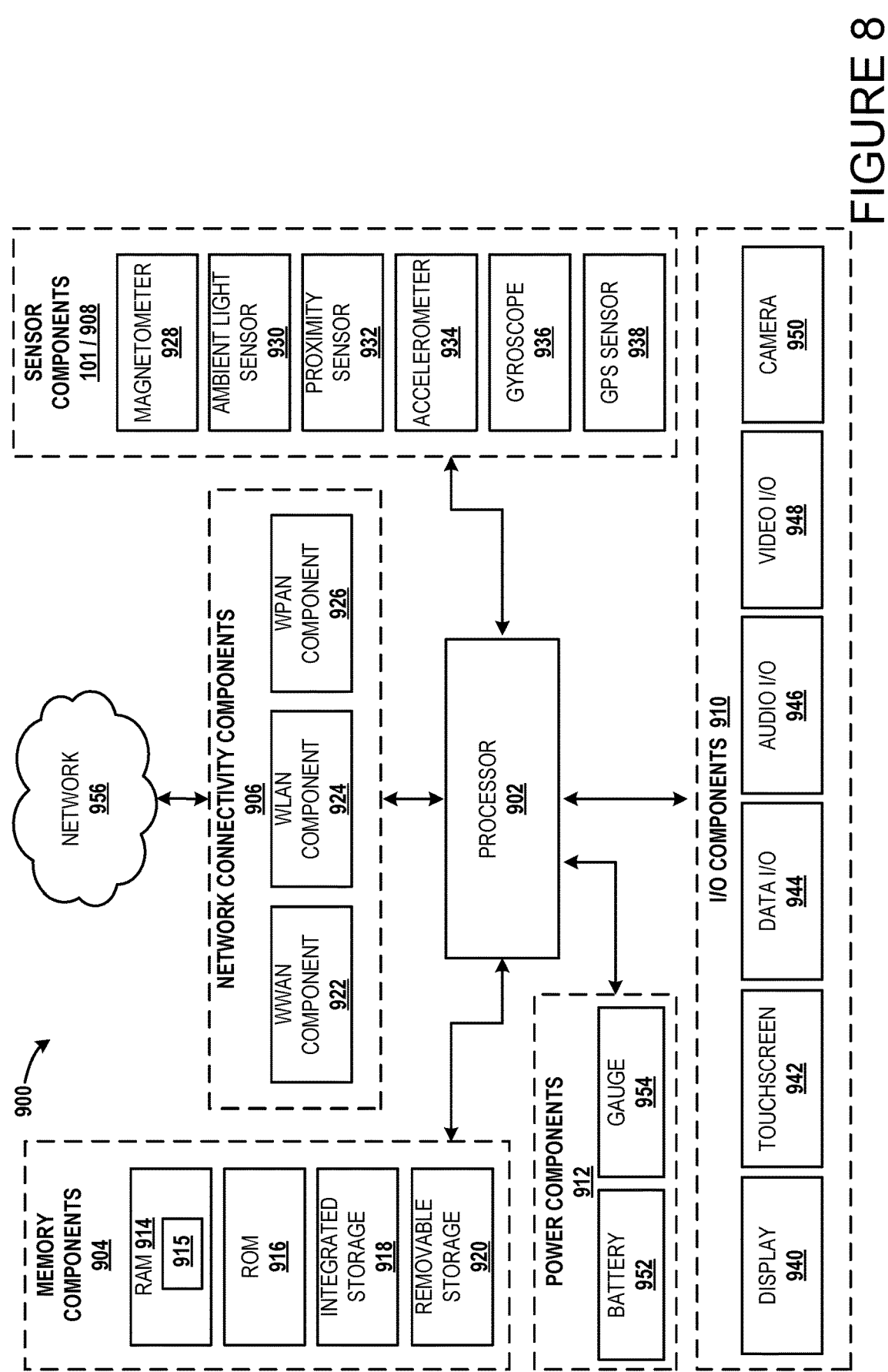
FIG. 8 is a computer architecture diagram illustrating an illustrative computer hardware and software architecture for a computing system capable of implementing aspects of the techniques and technologies presented herein.

Turning now to FIG. 8, an illustrative computing device architecture 900 for a computing device that is capable of executing various software components described herein. The computing device can be a computer or any hardware unit. The computing device architecture 900 is applicable to computing devices that facilitate computing described herein. The computing device architecture 900 can be the architecture of the system 101 of FIG. 1. In some configurations, the computing devices include, but are not limited to, a near-to-eye display device, consoles, blades of a server rack, etc. The computing device architecture 900 can also apply to any other device that may use or implement parts of the present disclosure, including, but not limited to, mobile telephones, tablet devices, slate devices, portable video game devices, and the like. Moreover, aspects of the computing device architecture 900 may be applicable to traditional desktop computers, portable computers (e.g., laptops, notebooks, ultra-portables, and netbooks), server computers, and other computer systems, such as those described herein. For example, the single touch and multi-touch aspects disclosed herein below may be applied to desktop computers that utilize a touchscreen or some other touch-enabled device.

The computing device architecture 900 illustrated in FIG. 8 includes a processor 902, memory components 904, network connectivity components 906, sensor components 908, input/output components 912, and power components 912. In the illustrated configuration, the processor 902 is in communication with the memory components 904, the network connectivity components 906, the sensor components 908, the input/output ("I/O") components 910, and the power components 912. Although no connections are shown between the individuals components illustrated in FIG. 8, the components can interact to carry out device functions. In some configurations, the components are arranged so as to communicate via one or more busses (represented by one or more lines between the components).

The memory components 904 is connected to the CPU 902 through a mass storage controller (not shown) and a bus. The memory components 904 and its associated computer-readable media provide non-volatile storage for the computer architecture 900. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, the computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 900. For purposes the claims, the phrase "computer storage device," "computer storage medium," "computer-readable storage medium," "computer-readable storage device," "non-transitory computer storage media" and variations thereof, does not include waves, signals, and/or other transitory and/or intangible communication media, per se. A storage device can include any type of solid state drive, optical drive, or a rotating media drive.

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, a touch-enabled input.

In some configurations, the processor 902 includes a graphics processing unit ("GPU") configured to accelerate operations performed by the CPU, including, but not limited to, operations performed by executing general-purpose scientific and/or engineering computing applications, as well as graphics-intensive computing applications such as high-resolution video (e.g., 720P, 1030P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein the sequential part of an application executes on the CPU and the computationally intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("POP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, California and others. In some configurations, the processor 902 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 904 include random access memory ("RAM") 914, read-only memory ("ROM") 916, an integrated storage memory ("integrated storage") 918, or a removable storage memory ("removable storage") 920. In some configurations, the RAM 914 or a portion thereof, the ROM 916 or a portion thereof, and/or some combination the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920. The RAM or any other component can also store the device module 915 or other software modules for causing execution of the operations described herein.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system includes, but is not limited to WINDOWS MOBILE OS from Microsoft Corporation of Redmond, Washington, WINDOWS PHONE OS from Microsoft Corporation, WINDOWS from Microsoft Corporation, BLACKBERRY OS from Research In Motion Limited of Waterloo, Ontario, Canada, IOS from Apple Inc. of Cupertino, California, and ANDROID OS from Google Inc. of Mountain View, California. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The magnetometer 928 is configured to measure the strength and direction of a magnetic field In some configurations the magnetometer 928 provides measurements to a compass application program stored within one of the memory components 904 in order to provide a user with accurate directions in a frame of reference including the cardinal directions, north, south, east, and west. Similar measurements may be provided to a navigation application program that includes a compass component. Other uses of measurements obtained by the magnetometer 928 are contemplated.

The ambient light sensor 930 is configured to measure ambient light. In some configurations, the ambient light sensor 930 provides measurements to an application program stored within one of the memory components 904 in order to automatically adjust the brightness of a display (described below) to compensate for low-light and highlight environments. Other uses of measurements obtained by the ambient light sensor 930 are contemplated.

The proximity sensor 932 is configured to detect the presence of an object in proximity to the computing device without direct contact. In some configurations, the proximity sensor 932 detects the presence of a user's body (e.g., the user's face) and provides this information to an application program stored within one of the memory components 904 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 932 are contemplated.

The accelerometer 934 is configured to measure proper acceleration. In some configurations, output from the accelerometer 934 is used by an application program as an input mechanism to control some functionality of the application program. For example, the application program may be a video game in which a character, a portion thereof, or an object is moved or otherwise manipulated in response to input received via the accelerometer 934. In some configurations, output from the accelerometer 934 is provided to an application program for use in switching between landscape and portrait modes, calculating coordinate acceleration, or detecting a fall. Other uses of the accelerometer 934 are contemplated.

The gyroscope 936 is configured to measure and maintain orientation. In some configurations, output from the gyroscope 936 is used by an application program as an input mechanism to control some functionality of the application program. For example, the gyroscope 936 can be used for accurate recognition of movement within a 3D environment of a video game application or some other application. In some configurations, an application program utilizes output from the gyroscope 936 and the accelerometer 934 to enhance control of some functionality of the application program. Other uses of the gyroscope 936 are contemplated.

The GPS sensor 938 is configured to receive signals from GPS satellites for use in calculating a location. The location calculated by the GPS sensor 938 may be used by any application program that requires or benefits from location information. For example, the location calculated by the GPS sensor 938 may be used with a navigation application program to provide directions from the location to a destination or directions from the destination to the location. Moreover, the GPS sensor 938 may be used to provide location information to an external location-based service, such as E911 service. The GPS sensor 938 may obtain location information generated via WI-FI, WIMAX, and/or cellular triangulation techniques utilizing one or more of the network connectivity components 906 to aid the GPS sensor 938 in obtaining a location fix. The GPS sensor 938 may also be used in Assisted GPS ("A-GPS") systems.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interface described below, or may include processing functionality built-in to the processor 902.

The display 940 is an output device configured to present information in a visual form. In particular, the display 940 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 940 is a liquid crystal display ("LCD") utilizing any active or passive matrix technology and any backlighting technology (if used). In some configurations, the display 940 is an organic light emitting diode ("OLED") display. Other display types are contemplated.

The touchscreen 942, also referred to herein as a "touch-enabled screen," is an input device configured to detect the presence and location of a touch. The touchscreen 942 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 942 is incorporated on top of the display 940 as a transparent layer to enable a user to use one or more touches to interact with objects or other information presented on the display 940. In other configurations, the touchscreen 942 is a touch pad incorporated on a surface of the computing device that does not include the display 940. For example, the computing device may have a touchscreen incorporated on top of the display 940 and a touch pad on a surface opposite the display 940.

In some configurations, the touchscreen 942 is a single-touch touchscreen. In other configurations, the touchscreen 942 is a multi-touch touchscreen. In some configurations, the touchscreen 942 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 942. As such, a developer may create gestures that are specific to a particular application program.

In some configurations, the touchscreen 942 supports a tap gesture in which a user taps the touchscreen 942 once on an item presented on the display 940. The tap gesture may be used for various reasons including, but not limited to, opening or launching whatever the user taps. In some configurations, the touchscreen 942 supports a double tap gesture in which a user taps the touchscreen 942 twice on an item presented on the display 940. The double tap gesture may be used for various reasons including, but not limited to, zooming in or zooming out in stages. In some configurations, the touchscreen 942 supports a tap and hold gesture in which a user taps the touchscreen 942 and maintains contact for at least a pre-defined time. The tap and hold gesture may be used for various reasons including, but not limited to, opening a context-specific menu.

In some configurations, the touchscreen 942 supports a pan gesture in which a user places a finger on the touchscreen 942 and maintains contact with the touchscreen 942 while moving the finger on the touchscreen 942. The pan gesture may be used for various reasons including, but not limited to, moving through screens, images, or menus at a controlled rate. Multiple finger pan gestures are also contemplated. In some configurations, the touchscreen 942 supports a flick gesture in which a user swipes a finger in the direction the user wants the screen to move. The flick gesture may be used for various reasons including, but not limited to, scrolling horizontally or vertically through menus or pages. In some configurations, the touchscreen 942 supports a pinch and stretch gesture in which a user makes a pinching motion with two fingers (e.g., thumb and forefinger) on the touchscreen 942 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 942. As such, the above gestures should be understood as being illustrative and should not be construed as being limiting in any way.

The data I/O interface component 944 is configured to facilitate input of data to the computing device and output of data from the computing device. In some configurations, the data I/O interface component 944 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 946 is configured to provide audio input and/or output capabilities to the computing device. In some configurations, the audio I/O interface component 946 includes a microphone configured to collect audio signals. In some configurations, the audio I/O interface component 946 includes a headphone jack configured to provide connectivity for headphones or other external speakers. In some configurations, the audio I/O interface component 946 includes a speaker for the output of audio signals. In some configurations, the audio I/O interface component 946 includes an optical audio cable out.

The video I/O interface component 948 is configured to provide video input and/or output capabilities to the computing device. In some configurations, the video I/O interface component 948 includes a video connector configured to receive video as input from another device (e.g., a video media player such as a DVD or BLURAY player) or send video as output to another device (e.g., a monitor, a television, or some other external display). In some configurations, the video I/O interface component 948 includes a High-Definition Multimedia Interface ("HDMI"), mini-HDMI, micro-HDMI, DisplayPort, or proprietary connector to input/output video content. In some configurations, the video I/O interface component 948 or portions thereof is combined with the audio I/O interface component 946 or portions thereof.

The camera 950 can be configured to capture still images and/or video. The camera 950 may utilize a charge coupled device ("CCD") or a complementary metal oxide semiconductor ("CMOS") image sensor to capture images. In some configurations, the camera 950 includes a flash to aid in taking pictures in low-light environments. Settings for the camera 950 may be implemented as hardware or software buttons. The camera can also include any type of sensor using any type of modality, e.g., a first modality may be under infrared, a second modality may be under a different spectrum, e.g., visible light, laser, etc. The camera may also include a time-of-flight sensor which can operate using any suitable medium, e.g., sonar, radar, etc. the camera can also be in the form of a lidar sensor for capturing images and distances device and will object in a surrounding environment.

Although not illustrated, one or more hardware buttons may also be included in the computing device architecture 900. The hardware buttons may be used for controlling some operational aspect of the computing device. The hardware buttons may be dedicated buttons or multi-use buttons. The hardware buttons may be mechanical or sensor-based.

The illustrated power components 914 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The battery gauge 954 can be configured to measure battery parameters such as current, voltage, and temperature. In some configurations, the battery gauge 954 is configured to measure the effect of a battery's discharge rate, temperature, age and other factors to predict remaining life within a certain percentage of error. In some configurations, the battery gauge 954 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 912 may also include a power connector, which may be combined with one or more of the aforementioned I/O components 910. The power components 912 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for controlling a power consumption level caused by an application configured for execution on a hardware unit, wherein the method comprises:

receiving input data indicating a power threshold for the application;

receiving real-time power consumption data indicating the power consumption level of the hardware unit executing the application, wherein the application is the majority contributor of the power consumption within the operating environment;

determining an anticipated workload increase associated with one or more operations of the application during a given period of time;

in anticipation of the anticipated workload increase, proactively scheduling adjustments to one or more operating parameters of the application to prevent exceeding the power threshold during the anticipated workload increase;

concurrently monitoring the anticipated workload and the real-time power consumption data to determine that the power level consumed by the hardware unit meets one or more criteria with respect to the power threshold within a predetermined time period; and in response to determining that the power level consumed by the hardware unit meets one or more criteria with respect to the power threshold within the predetermined time period, causing the application to self-regulate the power consumption level by adjusting one or more operating parameters of the application executing on the hardware unit to reduce the power consumption level, wherein adjusting the one or more operating parameters of the application comprises:

determining a selection of prioritized tasks to be executed during runtime of the application based on both the anticipated workload increase and current power consumption level;

determining a selection of optional tasks to be conditionally executed during runtime of the application based on both the anticipated workload increase and current power consumption level; and dynamically adjusting or terminating the optional tasks while scheduling the prioritized tasks to allow the application to self-regulate and operate under the power threshold, wherein the adjustments are made both proactively in response to the anticipated workload increase and reactively in response to the real-time power consumption data.

2. The method of claim 1, wherein adjusting the one or more operating parameters of the application includes at least one of reducing a rendered resolution, reducing a number of frames per second, modifying an anti-aliasing parameter, modifying a lighting parameter, or modifying a shadow parameter, wherein the method further comprises reducing a clock frequency of one or more processing units of the hardware unit or causing a one or more processing units of the hardware unit to operate in a low-power state, in response to determining that the power level consumed by the hardware unit exceeds the power threshold within the predetermined time period.

3. The method of claim 1, wherein the hardware unit includes an execution environment where the application is the majority consumer of power of the hardware unit or a majority influencer of power consumption of the of the hardware unit.

4. The method of claim 1, further comprising:

causing a display of a notification that the application is capable of running in a power-capped mode;

receiving an input for activating a power-capped mode for the application, wherein the input is received in association with the input data indicating the power threshold for the application; and activating the power-capped mode in response to receiving the input for activating the power-capped mode, wherein the power-capped mode causes the hardware unit to monitor the power level consumed by the hardware unit to cause the hardware unit to adjust the one or more operating parameters of the application in response to determining that the power level consumed by the hardware unit exceeds the power threshold within the predetermined time period.

5. The method of claim 1, further comprising:

causing a display of a notification that the application is running in a power-capped mode, wherein the power-capped mode causes the hardware unit to monitor the power level consumed by the hardware unit to cause the hardware unit to adjust the one or more operating parameters of the application; and causing a display of real-time telemetry data indicating the power level consumed by the hardware unit and caused by the application.

6. A computing device for controlling a power consumption level caused by an application configured for execution on the device, comprising:

one or more processing units; and a computer-readable storage medium having encoded thereon computer-executable instructions to cause the one or more processing units to:

receive input data indicating a power threshold for the application;

receive real-time power consumption data indicating the power consumption level of the hardware unit executing the application, wherein the application is the majority contributor of the power consumption within the operating environment;

determine an anticipated workload increase associated with one or more operations of the application during a given period of time;

in anticipation of the anticipated workload increase, proactively scheduling adjustments to one or more operating parameters of the application to prevent exceeding the power threshold during the anticipated workload increase;

concurrently monitor the anticipated workload and the real-time power consumption data to determine that the power level consumed by the hardware unit meets one or more criteria with respect to the power threshold within a predetermined time period; and in response to determining that the power level consumed by the hardware unit meets one or more criteria with respect to the power threshold within the predetermined time period, causing the application to self-regulate the power consumption level by adjusting one or more operating parameters of the application executing on the hardware unit to reduce the power consumption level, wherein adjusting the one or more operating parameters of the application comprises:

determining a selection of prioritized tasks to be executed during runtime of the application based on both the anticipated workload increase and current power consumption level;

determining a selection of optional tasks to be conditionally executed during runtime of the application based on both the anticipated workload increase and current power consumption level; and dynamically adjusting or terminating the optional tasks while scheduling the prioritized tasks to allow the application to self-regulate and operate under the power threshold, wherein the adjustments are made both proactively in response to the anticipated workload increase and reactively in response to the real-time power consumption data.

7. The device of claim 6, wherein adjusting the one or more operating parameters of the application includes at least one of reducing a rendered resolution, reducing a number of frames per second, modifying an anti-aliasing parameter, modifying a lighting parameter, or modifying a shadow parameter, wherein the method further comprises reducing a clock frequency of one or more processing units of the hardware unit or causing a one or more processing units of the hardware unit to operate in a low-power state.

8. The device of claim 6, wherein the device includes an execution environment where the application is the majority consumer of power of the device or a majority influencer of power consumption of the of the device.

9. The device of claim 6, wherein the instructions further cause the one or more processing units to:

cause a display of a notification that the application is capable of running in a power-capped mode;

receive an input for activating a power-capped mode for the application, wherein the input is received in association with the input data indicating the power threshold for the application; and activate the power-capped mode in response to receiving the input for activating the power-capped mode, wherein the power-capped mode causes the device to monitor the power level consumed by the device to cause the device to adjust the one or more operating parameters of the application in response to determining that the power level consumed by the device exceeds the power threshold within the predetermined time period.

10. A computer-readable storage medium having encoded thereon computer-executable instructions to cause the one or more processing units of a device to control a power consumption level caused by an application configured for execution on the device, the instructions to cause the one or more processing units to:

receive input data indicating a power threshold for the application;

receive real-time power consumption data indicating the power consumption level of the hardware unit executing the application, wherein the application is the majority contributor of the power consumption within the operating environment;

determine an anticipated workload increase associated with one or more operations of the application during a given period of time;

in anticipation of the anticipated workload increase, proactively scheduling adjustments to one or more operating parameters of the application to prevent exceeding the power threshold during the anticipated workload increase;

concurrently monitor the anticipated workload and the real-time power consumption data to determine that the power level consumed by the hardware unit meets one or more criteria with respect to the power threshold within a predetermined time period; and in response to determining that the power level consumed by the hardware unit meets one or more criteria with respect to the power threshold within the predetermined time period, causing the application to self-regulate the power consumption level by adjusting one or more operating parameters of the application executing on the hardware unit to reduce the power consumption level, wherein adjusting the one or more operating parameters of the application comprises:

determining a selection of prioritized tasks to be executed during runtime of the application based on both the anticipated workload increase and current power consumption level;

determining a selection of optional tasks to be used for conditionally executed during runtime of the application based on both the anticipated workload increase and current power consumption level; and dynamically adjusting or terminating the optional tasks while scheduling the prioritized tasks to allow the application to self-regulate and operate under the power threshold, wherein the adjustments are made both proactively in response to the anticipated workload increase and reactively in response to the real-time power consumption data.

11. The computer-readable storage medium of claim 10, wherein adjusting the one or more operating parameters of the application includes at least one of reducing a rendered resolution, reducing a number of frames per second, modifying an anti-aliasing parameter, modifying a lighting parameter, or modifying a shadow parameter, wherein the method further comprises reducing a clock frequency of one or more processing units of the hardware unit or causing a one or more processing units of the hardware unit to operate in a low-power state, in response to determining that the power level consumed by the hardware unit exceeds the power threshold within the predetermined time period.

12. The computer-readable storage medium of claim 10, wherein the power level consumed by the device meets one or more criteria with respect to the power threshold when the power level is within a predetermined range of the power threshold for a predetermined time, and wherein adjusting the one or more operating parameters includes adjustments that reduce the power level consumed by the device caused by the execution of the application.

13. The computer-readable storage medium of claim 10, wherein the power level consumed by the device meets one or more criteria with respect to the power threshold when the power level exceeds the power threshold by a predetermined magnitude, and wherein adjusting the one or more operating parameters includes terminating the execution of the application.

14. The computer-readable storage medium of claim 10, wherein the device includes an execution environment where the application is the majority consumer of power of the device or a majority influencer of power consumption of the of the device.

15. The method of claim 1, wherein the predetermined time period is established to prevent false positive readings that cause unnecessary adjustments.

16. The method of claim 1, wherein the predetermined time period is based on an anticipated increase in power consumption during the predetermined time period, wherein the adjustment to the of the application is not applied outside of the predetermined time period.

* * * * *